T. J. HOBBS & L. HUNTING.
Hobby-Horse.

No. 199,711. Patented Jan. 29, 1878.

Witnesses:
Inventors:
Thomas J. Hobbs.
Leonard Hunting.
Per C. H. Watson & Co. Attorneys.

UNITED STATES PATENT OFFICE.

THOMAS J. HOBBS AND LEONARD HUNTING, OF BALDWINSVILLE, MASS.

IMPROVEMENT IN HOBBY-HORSES.

Specification forming part of Letters Patent No. 199,711, dated January 29, 1878; application filed October 26, 1877.

*To all whom it may concern:*

Be it known that we, THOMAS J. HOBBS and LEONARD HUNTING, of Baldwinsville, in the county of Worcester and State of Massachusetts, have invented certain new and useful Improvements in Rocking-Horses; and we do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to what is termed a "hobby-horse," or toy for children, having for its object to furnish a device which will be amusing to children, which will not injure them, is easily manipulated, and not liable to get out of repair, by attaching the horse to the frame by means of pivots, as will be hereinafter more fully described, and pointed out by the claim.

Figure 1:
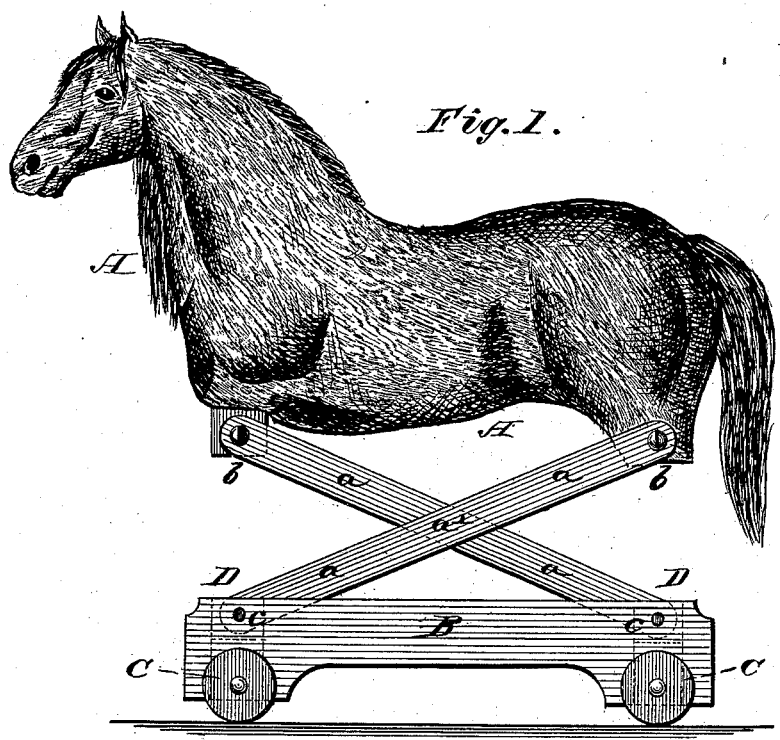
Figure 2:
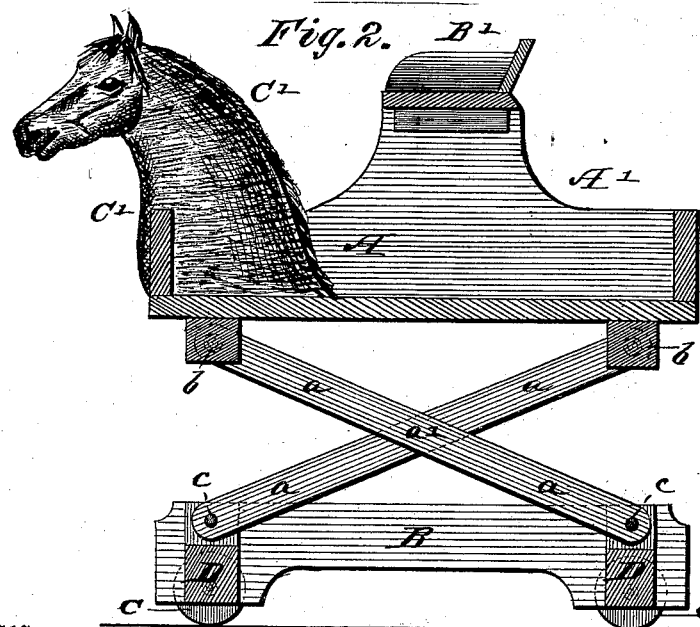

In the annexed drawings, Figure 1 is a side elevation of our rocking-horse, and Fig. 2 is a central vertical section, showing carriage-box, seat, and horse-head.

A represents the horse; B, the side bars, and D the cross-bars, forming a rectangular frame, which is supported by wheels C, so that the frame and entire device may be wheeled about as desired. The means for connecting the horse and the frame are bars $a$, which run diagonally upon either side from the horse to the frame, crossing each other at $a'$, and pivoted to the horse at $b$ and to the frame at $c$, as represented, by which means a regular rocking motion lengthwise may be given to the horse without the use of rockers or springs; and this device being supported upon pivots at either end, both upon the horse and frame, the child upon the horse can more easily balance and manipulate the same.

The device operates without any unusual noise, and is not liable to get out of repair.

If desired, a box, A', representing a carriage-box, provided with a seat, B', and the representation of a horse's head, C', may be substituted for the horse A.

We are aware that cradles have been used with pivoted bars, dispensing with rockers, to give the cradle a transverse rocking movement, and do not, therefore, claim such as our invention; but,

Having thus fully described the invention, what we claim as new, and desire to secure by Letters Patent, is—

The horse A, in combination with the pivoted bars $a$, pivoted at the ends of the horse and to the frame B, crossing each other at $a'$, having a longitudinal motion, and forming a rocking-horse without the use of rockers or springs, constructed and arranged substantially as set forth.

In testimony that we claim the foregoing as our own we have hereto affixed our signatures in presence of two witnesses.

THOMAS J. HOBBS.
LEONARD HUNTING.

Witnesses:
J. F. GREEN,
E. GREEN.